United States Patent Office 3,483,264
Patented Dec. 9, 1969

3,483,264
PURIFICATION OF POLYHYDRIC ALCOHOLS
George T. Tsao, Granite City, Ill., assignor to Union Starch & Refining Co., Inc., Columbus, Ind., a corporation of Indiana
No Drawing. Filed July 8, 1966, Ser. No. 563,664
Int. Cl. C07c 29/28
U.S. Cl. 260—637                    5 Claims

ABSTRACT OF THE DISCLOSURE

Inorganic salts and ash impurities can be removed from aqueous solutions of polyhydric alcohols by concentrating the aqueous solution to a water content of less than about 79%, adding cyclohexylamine to the concentrated solution to form a two-phase system, distilling the resulting mixture to remove a substantial proportion of the azeotropic mixture of water and cyclohexylamine causing the inorganic salts and ash impurities to precipitate as solids and separating such impurity solids from the remaining polyhydric alcohol-containing liquid.

---

This invention relates to a method for purifying polyhydric alcohols such as glycerol, erythritol, xylitol, arabitol, mannitol, sorbitol, etc. More particularly it relates to a method of removing chlorides, sulfates, phosphates and similar inorganic salts as well as other minor impurities which ordinarily contaminate aqueous solutions of chemically prepared or recovered polyhydric alcohols.

Among the objects of the invention, therefore, is to provide a method for purifying aqueous solutions of polyhydric alcohols.

Among other objects of the invention is to provide a method for the economical removal of chlorides, sulfates, phosphates or other inorganic salts from aqueous solutions of polyhydric alcohols.

Processes for the manufacture or recovery of polyhydric alcohols generally provide a raw solution containing high levels of salts and high ash contents, which require purification. The purification can be costly and difficult. Whether raw solutions of polyhydric alcohols are prepared by hydrogenation or by fermentation or enzyme conversion processes, such solutions are apt to contain large amounts of inorganic salts. In at least one fermentation process for producing glycerol, for example, relatively large quantities of sodium or ammonium sulfate are added during the process. Other fermentation processes for producing glycerol involve the addition of sodium carbonate and other alkaline materials. The recovery of glycerol by saponification processes provides a glycerol solution with a high ash content. The production of polyhydric alcohols by electrolytic reduction of carbohydrates requires the addition of electrolytes such as sodium sulfite which is converted to sodium sulfate as the sugars are reduced. Hydrolysates of wood, corncobs, cottonseed hulls, ivory nuts, mannan, phosphomannan, etc., which contain various saccharides also contain significant amounts of salt and other impurities. Polyhydric alcohols obtained from the hydrogenation of these hydrolysates also contain significant amounts of salt and other impurities.

One of the best methods so far discovered for removing salts from polyhydric alcohol solutions is by ion-exchange resins. The process is expensive especially when the solutions contain substantial amounts of salts.

The term "raw aqueous solution of polyhydric alcohols" will be understood to include all aqueous solutions of such polyhydric alcohols which contain residual salt or ash impurities resulting from some previous treatment.

The objects of the invention are attained by evaporating water from the raw aqueous solution of polyhydric alcohol to provide a solution having a water content of less than about 79%, thereafter adding cyclohexylamine in the volume ratio of cyclohexylamine to solution to provide a two-phase system. Thereafter one proceeds in one of two ways (1) separation of the cyclohexylamine-rich layer followed by distillation thereof to remove the cyclohexylamine or (2) distillation of the mix as a whole to remove the cyclohexylamine in azeotropic mixture with water.

(1) The separation of the cyclohexylamine-rich layer which contains the polyhydric alcohols from the remaining phase consisting mostly of water and salts, removes a significant proportion of salts from the polyhydric alcohol but does not remove the overwhelming proportion of such salts. Upon subsequent distillation of the cyclohexylamine more water will be removed and salt held in solution by said water will be precipitated.

(2) According to the alternative procedure, the separation step is eliminated since the salt and water eliminated by the separation step does not interfere with the purification of the solution by distillation. Water and cyclohexylamine (B.P. 133–135° C.) form an azeotropic mixture which boils at 92–95° C. under atmospheric pressure. Thus, distillation effects the removal of water along with the cyclohexylamine and as water is removed, the water-soluble salts are precipitated. Without the aid of the azeotropic mixture, it would be difficult to achieve anything like a complete dehydration. With sorbitol, for example, a glassy solid is obtained before the last few percent of water is removed by distillation unless cyclohexylamine is present. The salts precipitated from the solution during dehydration can be separated by filtration. It is not necessary to completely dehydrate the solution, for example, a solution containing as much as about 1% of water will have only a slight salt contamination which can be removed by the ion exchange method or may be allowed to remain in the product where extra purity is not required.

The distillation or evaporation of the cyclohexylamine may be conducted at atmospheric or at reduced pressure. Instead of distilling all of the cyclohexylamine from the system or from the cyclohexylamine-rich phase, the bulk thereof can be removed by extracting the solution with a solvent in which the polyhydric alcohols are insoluble and in which the cyclohexylamine is soluble. Toluene is such a solvent. Additional small amounts of the cyclohexylamine remaining can then be removed by distillation either with or without the addition of water. The final traces of the cyclohexylamine can then be removed by ion exchange treatment.

The process of removing such salts and other impurities may be repeated if desired. It may be desirable, however, to give the final polishing treatment of the solution with ion-exchange resins especially where it is desirable to eliminate the last traces of salts or other ionic impurities. The resin treatment required for this final polishing is minimal and comparatively inexpensive.

In the process, the cyclohexylamine is recovered and recycled. The process of recovering cyclohexylamine from aqueous solutions thereof is known and need not be further described in this specification.

The invention will be exemplified in the following specific examples with the understanding that these examples are preferential and illustrative and are not to be considered as limiting the invention to the data given. In the examples, a method of chlorine analysis has been employed as an index to the effectiveness of the salt removal, it having been found that other salts are removed in substantially the same proportionate ratios as are the chlorides.

EXAMPLE 1

One liter of an aqueous solution containing 20 g. mannitol, 21 g. sorbitol, 16 g. sodium chloride and other impurities was evaporated to about 200 ml. Cyclohexylamine (500 ml.) was added and evaporation continued under atmospheric pressure until the temperature reached 130° C. The residue was allowed to stand overnight to complete crystallization of precipitated salts. The crystals were removed by filtration. The clear filtrate was added to 300 ml. water and the mix evaporated to remove cyclohexylamine. To check the effectiveness of the purification, the final solution obtained was analyzed for chlorine. The initial chlorine contamination was 23.6 g. chlorine per 100 g. polyols, whereas the final chlorine contamination after the treatment was 1.4 g. chlorine per 100 g. polyols.

EXAMPLE 2

The process as conducted as in Example 1 except that the evaporation after adding the cyclohexylamine was continued until the temperature reached 134° C. To do this, a total of 1000 ml. of cyclohexylamine was added to maintain the fluidity of the solution. The final chlorine contamination found was 0.17 g. per 100 g. polyols.

EXAMPLE 3

One liter of an aqueous solution containing 100 g. of glycerol, 30 g. sodium chloride and other impurities was first evaporated to provide about 150 ml. of a very heavy liquor. 200 ml. cyclohexylamine were added to the heavy liquor. The evaporation was continued under vacuum until crystals formed in the mixture. The crystals that appeared in the mixture were removed by filtration. The filter cake and the containers were washed with 100 ml. fresh cyclohexylamine. The filtrate and the washing liquids were combined and distilled to remove cyclohexylamine. Water was added to replace cyclohexylamine as the solvent of the solution. Finally, 200 ml. of an aqueous solution was obtained. The initial solution had a chlorine contamination of 15 g. per 100 g. polyols whereas the final solution had a chlorine contamination of 1.4 g. chlorine per 100 g. polyols.

EXAMPLE 4

A solution containing 500 g. dextrose, 171 g. sodium aluminate and 76 g. sodium hydroxide per 100 ml. was incubated at 30° C. for 24 hours. The solution was then neutralized with concentrated hydrochloric acid to about pH 5. Aluminum hydroxide precipitated. Water was added to reduce the viscosity. The mixture was then filtered to obtain a clear solution. The solution was hydrogenated under pressure of about 1200 p.s.i. with the aid of a conventional nickel catalyst. The hydrogenated solution obtained after removal of the catalyst by filtration was evaporated to about 75% dissolved solids. A crop of mannitol crystals were collected by filtration. The filtrate was found to contain 25.3% mannitol, based upon the total amount of hexitols and 7.4 g. of chlorine (as NaCl) per 100 g. of hexitols.

The filtrate was then evaporated to provide a heavy liquor of about 82% dissolved solids. The heavy liquor was mixed with 4 times its volume of cyclohexylamine. The total mixture was heated to 90° C. in a steam bath and maintained at 90° for a few minutes. The mixture was then filtered while hot to remove precipitated NaCl crystals. The filtrate was evaporated to remove most of the cyclohexylamine. Water was added and the mixture was evaporated further to remove cyclohexylamine. The final aqueous solution obtained was analyzed for chlorine. The chlorine contamination now is 4.4 g. of chlorine per 100 g. of hexitols. This relatively high level of chlorine contamination in the final treated product comparing with the levels of Examples 1, 2 and 3, illustrates the effect of further water removal after addition of cyclohexylamine but before filtration to remove precipitates, as discussed previously in this disclosure. In Examples 1, 2 and 3, further water removal was made after cyclohexylamine was added to the polyol solution; in this example, after cyclohexylamine was added, no further removal of water as an azeotropic mixture with cyclohexylamine was made before the filtration step. The water content in the final solution of Example 4 was higher than those of Examples 1, 2 and 3, and so was the chlorine contamination in the final treated solutions.

The features and principles underlying the invention described above in connection with specific exemplifications will suggest to those skilled in the art many other modifications thereof. It is accordingly desired that the appended claims shall not be limited to any specific feature or details thereof.

I claim:
1. A method for purifying aqueous solutions of polyhydroxy alkanes comprising
   (a) providing a raw aqueous solution of at least one polyhydroxy alkane containing dissolved inorganic salt as a contaminant,
   (b) evaporating said solution to provide a solution containing no more than about 79% of water,
   (c) adding sufficient cyclohexylamine to the evaporated solution to provide a two-phase system,
   (d) distilling the solution so as to remove a substantial proportion of the azeotropic mixture of water and cyclohexylamine from said solution, and
   (e) removing precipitated solid materials from the remaining solution.
2. A method as claimed in claim 1 comprising filtering the solution after step (c) and before step (d).
3. The method as claimed in claim 1 comprising adding the solution obtained from step (e) to water and removing the residual cyclohexylamine therefrom by distillation.
4. The method as claimed in claim 1 comprising adding sufficient cyclohexylamine to the solution in step (c) to remove substantially all of the water therefrom as an azeotropic mixture of water and cyclohexylamine in step (d).
5. The method as claimed in claim 1 wherein the raw aqueous solution of polyhydroxy alkane comprises at least one compound selected from the group consisting of glycerol, erythritol, xylitol, arabitol, mannitol, and sorbitol.

References Cited

UNITED STATES PATENTS 2,377,306   6/1945   Brittain et al. _____ 203—47

FOREIGN PATENTS 730,759   5/1955   Great Britain.

OTHER REFERENCES

Laemmle et al., "Ind. and Eng. Chemistry," vol. 52, January 1960, pp. 33–36.

LEON ZITVER, Primary Examiner

J. E. EVANS, Assistant Examiner

U.S. Cl. X.R.

203—47, 59; 210—27, 56